(12) United States Patent
Criminisi

(10) Patent No.: US 8,781,173 B2
(45) Date of Patent: Jul. 15, 2014

(54) COMPUTING HIGH DYNAMIC RANGE PHOTOGRAPHS

(75) Inventor: Antonio Criminisi, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 306 days.

(21) Appl. No.: 13/406,872

(22) Filed: Feb. 28, 2012

(65) Prior Publication Data

US 2013/0223690 A1  Aug. 29, 2013

(51) Int. Cl.
    *G06K 9/00*   (2006.01)

(52) U.S. Cl.
     USPC .......................... 382/106; 382/109; 382/195

(58) Field of Classification Search
     None
     See application file for complete search history.

(56) References Cited

U.S. PATENT DOCUMENTS

| | | | |
|---|---|---|---|
| 6,297,145 B1 * | 10/2001 | Ito .................................. | 438/619 |
| 6,298,145 B1 | 10/2001 | Zhang et al. | |
| 6,694,057 B1 | 2/2004 | Miller et al. | |
| 6,902,935 B2 * | 6/2005 | Kaufman et al. ............... | 436/63 |
| 7,239,719 B2 | 7/2007 | Bongiovanni et al. | |
| 7,265,752 B2 | 9/2007 | Sander et al. | |
| 7,274,810 B2 * | 9/2007 | Reeves et al. .................. | 382/128 |
| 7,471,848 B2 | 12/2008 | Fujimoto et al. | |
| 2002/0094112 A1 | 7/2002 | Makram-Ebeid | |
| 2002/0150305 A1 | 10/2002 | Gil et al. | |
| 2003/0011596 A1 | 1/2003 | Zhang et al. | |
| 2003/0144585 A1 | 7/2003 | Kaufman et al. | |
| 2003/0161516 A1 | 8/2003 | Vuylsteke | |
| 2003/0161518 A1 | 8/2003 | Vuylsteke | |
| 2003/0161519 A1 | 8/2003 | Vuylsteke | |
| 2005/0128211 A1 | 6/2005 | Berger et al. | |
| 2005/0163358 A1 | 7/2005 | Moeller | |
| 2006/0177150 A1 | 8/2006 | Uyttendaele et al. | |
| 2006/0245645 A1 | 11/2006 | Yatziv et al. | |
| 2006/0251298 A1 | 11/2006 | Bronstein et al. | |
| 2006/0251324 A1 | 11/2006 | Bachmann et al. | |
| 2007/0014462 A1 | 1/2007 | Rousson et al. | |
| 2007/0025616 A1 | 2/2007 | Grady et al. | |
| 2007/0031037 A1 | 2/2007 | Blake et al. | |
| 2007/0237421 A1 | 10/2007 | Luo et al. | |
| 2008/0002873 A1 | 1/2008 | Reeves et al. | |
| 2008/0033897 A1 | 2/2008 | Lloyd | |
| 2008/0044104 A1 | 2/2008 | Gering | |
| 2008/0069445 A1 | 3/2008 | Weber | |
| 2008/0075361 A1 | 3/2008 | Winn et al. | |

(Continued)

OTHER PUBLICATIONS

Pekka J. Toivanen. 1996. New geodesic distance transforms for grayscale images. Pattern Recogn. Lett. 17, 5 (May 1996), 437-450.*

(Continued)

*Primary Examiner* — Nancy Bitar
(74) *Attorney, Agent, or Firm* — Pablo Tapia; Jim Ross; Micky Minhas

(57) ABSTRACT

Computing high dynamic range photographs is described for example, to enable high ranges of intensities to be represented in a single image. In various embodiments two or more photographs of the same scene taken at different exposure levels are combined in a way which takes into account intensity or other gradients in the images to form a high dynamic range image. In embodiments geodesic distances (which take into account intensity or other image gradients) are computed and used to form weights for a weighted aggregation of the photographs. In some embodiments a user configurable parameter is operable to control a degree of mixing of the photographs as the high dynamic range image is formed.

20 Claims, 6 Drawing Sheets

(56) References Cited

U.S. PATENT DOCUMENTS

| | | | |
|---|---|---|---|
| 2008/0181503 | A1 | 7/2008 | Schclar et al. |
| 2009/0091645 | A1 | 4/2009 | Trimeche et al. |
| 2009/0102945 | A1 | 4/2009 | Chen |
| 2010/0272367 | A1* | 10/2010 | Criminisi et al. ............. 382/195 |
| 2010/0329554 | A1 | 12/2010 | Zhai et al. |
| 2011/0141121 | A1* | 6/2011 | Sharp et al. .................. 345/505 |

OTHER PUBLICATIONS

The Distance Transform Algorithm on a Two-Processor Computer Anders Forsmoo p. 114-118 and date : Sep. 27, 1999.*

Lischinski, et al., "Interactive Local Adjustment of Tonal Values", In Proceedings of ACM SIGGRAPH, vol. 25 Issue 3, Jul. 3, 2006, pp. 646-653.

Krawczyk, et al., "Perceptual Effects in Real-time Tone Mapping", In Proceedings of 21st Spring Conference on Computer Graphics, 2005, pp. 195-202.

Tico, et al., "Motion-Blur-Free Exposure Fusion", In Proceedings of 17th IEEE International Conference on Image Processing, Sep. 26-29, 2010, pp. 3321-3324.

"CSCI1290 : Project 5", Retrieved on: Dec. 16, 2011, Available at: http://www.cs.brown.edu/courses/csci1290/results/proj5/mwilde/.

Criminisi, et al., "Geodesic Image and Video Editing", In Technicolor Research and Innovation, F-35576 Cesson-Sevigne, France and ACM Transactions on Graphics 2010.

Criminisi, et al., "GeoS: Geodesic Image Segmentation", In ECCV 2008, Part I, LNCS 5302, pp. 99-112, 2008.

* cited by examiner

COMPUTING HIGH DYNAMIC RANGE PHOTOGRAPHS

BACKGROUND

The dynamic range of a photograph may be thought of as the range of intensity levels which may be represented in the photograph. For example, in the case of a widely used image format such as jpeg there are 8 bits per pixel which enables one of up to 256 different intensity levels to be stored at each pixel. This range is typically insufficient to represent the dynamic range that occurs in many environments. For example, where a photograph is taken of a scene of a window from inside a room or where a photograph is taken of a landscape. When a photograph is displayed on a display screen a similar limitation of dynamic range is experienced. Many displays are able to represent up to 8 bits per pixel only.

Existing approaches to increasing the dynamic range of photographs and digital images involve computing a radiance map where each pixel is represented using more than 8 bits per pixel. This typically involves taking several shots of the same scene using a tripod to support the camera and ensure it remains in the same position. This is relatively complex and time consuming and requires knowledge of the exposure settings at which images are captured. The radiance map is typically converted to a tone map to enable practical storage and/or display on apparatus configured for a maximum of 8 bits per pixel. The conversion from the radiance map to a tone map may comprise a non-linear mapping.

The embodiments described below are not limited to implementations which solve any or all of the disadvantages of known systems for computing high dynamic range photographs.

SUMMARY

The following presents a simplified summary of the disclosure in order to provide a basic understanding to the reader. This summary is not an extensive overview of the disclosure and it does not identify key/critical elements or delineate the scope of the specification. Its sole purpose is to present a selection of concepts disclosed herein in a simplified form as a prelude to the more detailed description that is presented later.

Computing high dynamic range photographs is described for example, to enable high ranges of intensities to be represented in a single image. In various embodiments two or more photographs of the same scene taken at different exposure levels are combined in a way which takes into account intensity or other gradients in the images to form a high dynamic range image. In embodiments geodesic distances (which take into account intensity or other image gradients) are computed and used to form weights for a weighted aggregation of the photographs. In some embodiments a user configurable parameter is operable to control a degree of mixing of the photographs as the high dynamic range image is formed.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
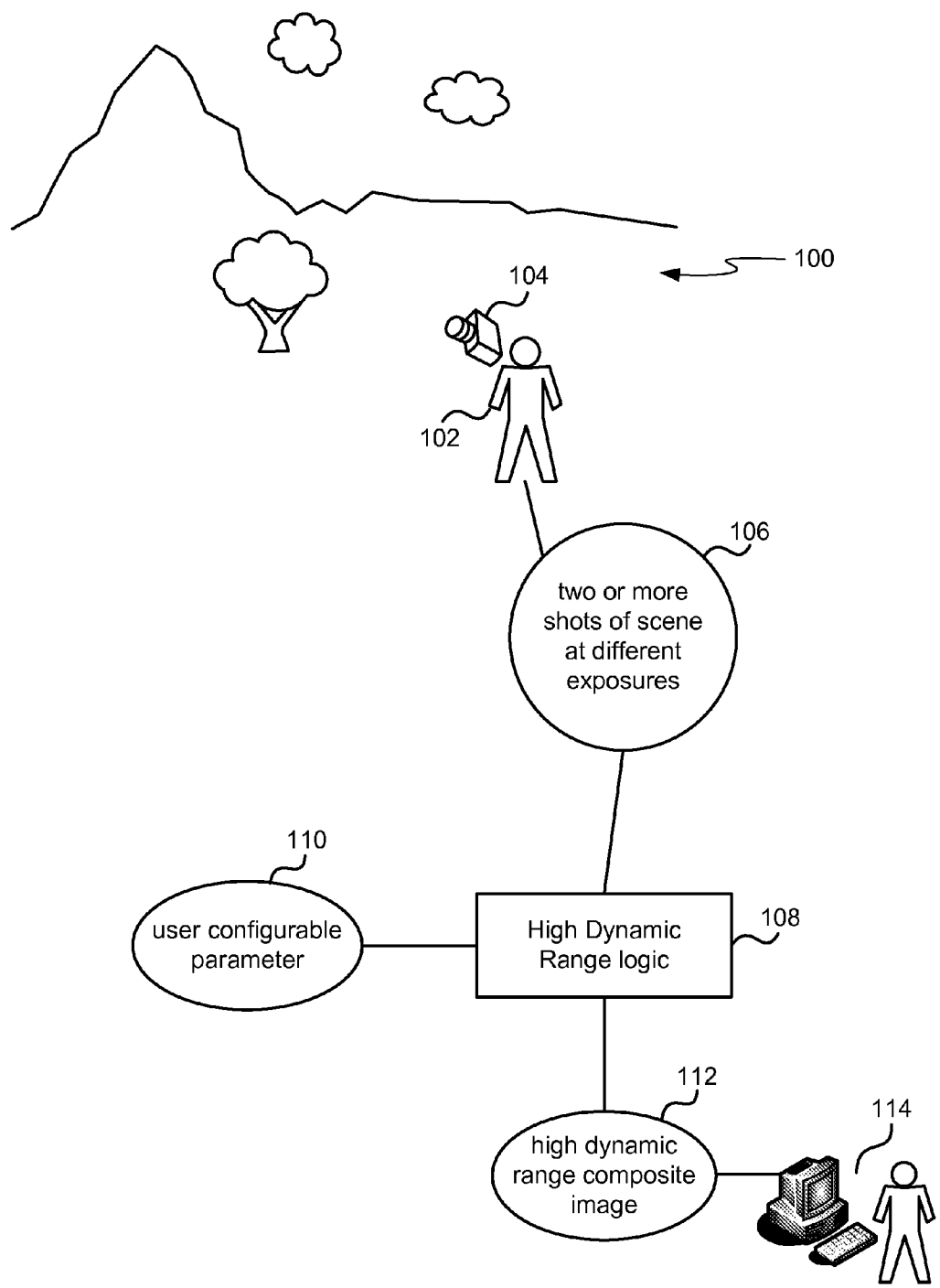
FIG. 1 is a schematic diagram of a person photographing a scene and of a high dynamic range logic used to form high dynamic range composite images from the photographs.

FIG. 1 is a schematic diagram of a person 102 photographing a scene 100 and of a high dynamic range logic 108 used to form high dynamic range composite images 112 from the photographs. In this example the person 102 is taking photographs using a camera 104 of a landscape scene. In practice any scene may be photographed using an image capture apparatus of any suitable type such as a digital still camera or a digital video camera. The photographs comprise digital images and may be of any resolution.

Two or more photographs (also referred to as shots 106) of the scene are captured at different exposures. For example, auto-bracketing functionality may be incorporated in the image capture apparatus to enable two or more shots of the same scene to be captured at appropriate exposures according to pre-configured settings and/or sensor data about the scene such as light meter readings. It is not necessary to use a tripod. The photographs (also referred to as images) are accessible to a high dynamic range logic which is computer-implemented and may be integral with the image capture apparatus or may be at another entity.

The images are placed into registration using any suitable image registration process at the high dynamic range logic and/or the image capture apparatus. The high dynamic range logic 108 processes the digital images (without the need for details of the exposure levels at which the shots were taken) to form one or more high dynamic range composite images 112 which may be viewed on a display 114. The (tone-mapped) high dynamic range composite image 112 may be of 8 bits per pixel and so may be displayed on a conventional 8 bits per pixel display without the need for a tone mapping step. The high dynamic range logic may receive one or more user configurable parameter values 110 for controlling the process of computing the high dynamic range composite images.

Figure 2:
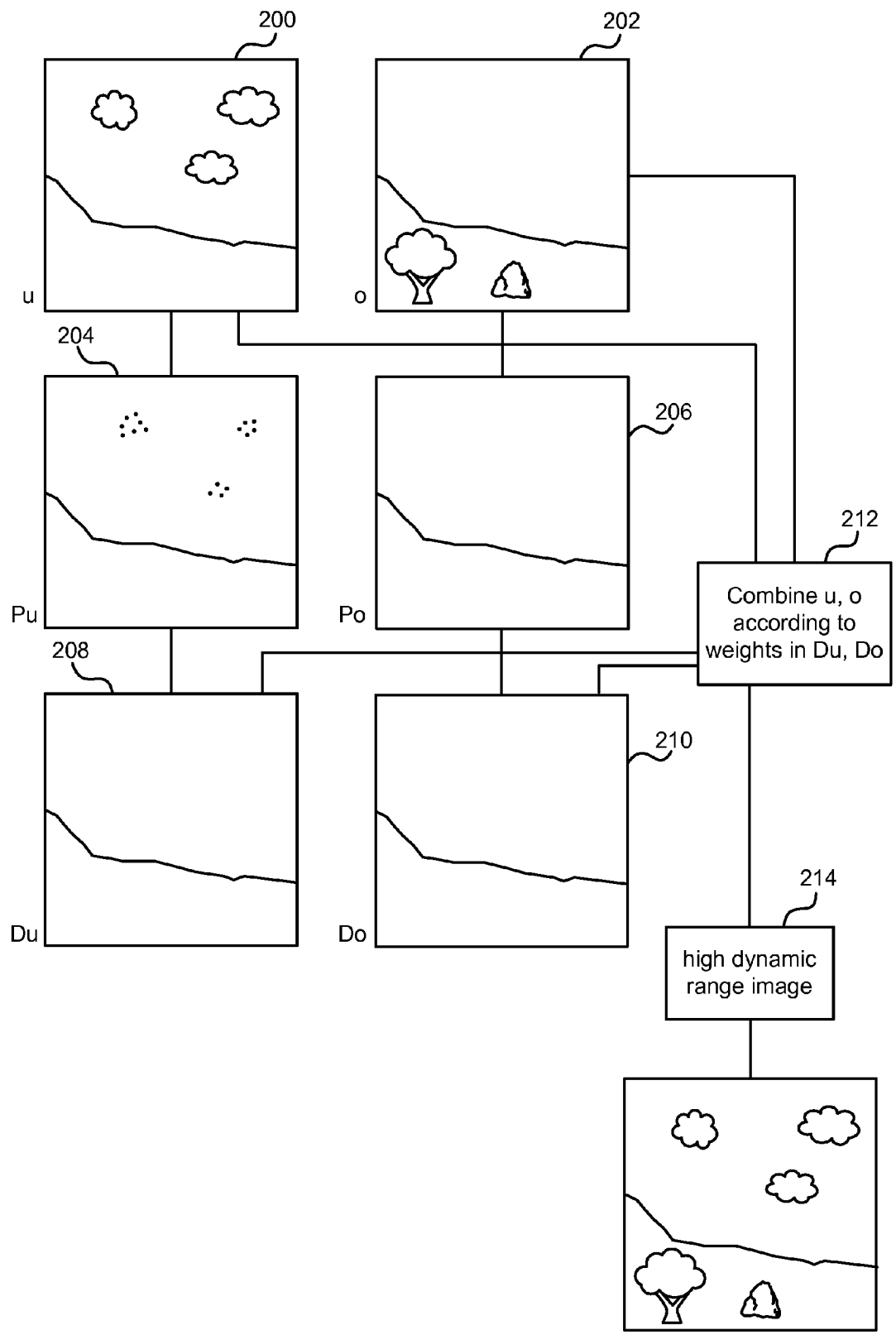
FIG. 2 is a schematic diagram of two photographs of the same scene taken using an auto-bracketing process and a schematic illustration of how these may be used to form a high dynamic range image.

FIG. 2 is a schematic diagram of two photographs 200, 202 of the same scene taken using an auto-bracketing process and a schematic illustration of how these may be used in an image processing process to form a high dynamic range image 214.

In this example two photographs 200, 202 each taken of the same scene but at different exposure levels are illustrated. However, it is also possible to use three or more photographs at different exposure levels. In the example illustrated photograph 200 is taken at a low exposure (under exposed) and depicts clouds in the sky above a mountain landscape. Detail in the mountain landscape is missing due to the limited range of intensity levels that may be captured. Photograph 202 is taken at a high exposure (over exposed) and depicts a tree and a rock in the mountain landscape but omits detail in the sky because of the over exposure. The photographs 200, 202 are placed into registration as mentioned above.

The underexposed photograph 200 is processed to produce a corresponding soft seed mask 204 having, for each image element, a probability that the image element is a member of the underexposed photograph. The overexposed photograph 202 is also processed to produce a corresponding soft seed mask 206. For a photograph at an exposure level the corresponding soft seed mask has, for each image element, a probability that the image element is depicted at that exposure level. A soft seed mask may comprise, for each image element of the received image, an indication as to whether that image element is appropriate for the exposure level of the received image. The soft seed masks may be computed in any suitable manner, for example, by forming histograms or in other ways as described in more detail below. The image elements may be pixels, groups of pixels such as blobs or patches, or other higher level components of an image.

Each photograph and its corresponding soft seed mask is used to compute a geodesic map 208, 210 having a distance value at each image element. The distance value is the shortest geodesic distance from that image element to a seed region. The seed region comprises all the image elements in the soft seed mask with probability values over a specified threshold for example. That is, the seed region may comprise image elements which are not contiguous. A geodesic distance is a distance which takes into account image content. For example, consider the intensities of the image elements as a height map. The shortest geodesic distance between two points in an image may then be one that travels around a region of high intensity rather than a Euclidean shortest path which travels "as the crow flies". In the embodiments described herein the geodesic distances take into account intensity gradients in an image. However, it is also possible to use geodesic distances which take into account gradients of other sources of information, such as texture gradients, color gradients, or gradients of probability maps.

The photographs 200, 202 are combined 212 according to weights in the geodesic maps 208, 210 to form a high dynamic range image 214 which depicts detail from the photographs 200, 202 at different exposure levels as indicated schematically in FIG. 2. A linear combination may be used. An example of a linear process of combining the photographs 200, 202 using weights proportional to the corresponding geodesic values is now described in more detail.

The high dynamic range image 214 may be represented as:

$$H(x,y)=W(x,y)U(x,y)+(1-W(x,y))O(x,y)$$

Where H is the high dynamic range image, x and y are coordinates, W is a matrix of weights specified below, U is the underexposed image and O is the overexposed image. D is the geodesic distance (using soft seed masks or exact seed masks) for either the underexposed or overexposed image as indicated by the subscripts.

W is a matrix of weights which may be specified as:

$$W(x,y) = \frac{e^{-\frac{D_U^2(x,y)}{\sigma^2}}}{Z}$$

Z is given by:

$$z = e^{-\frac{D_U^2(x,y)}{\sigma^2}} + e^{-\frac{D_O^2(x,y)}{\sigma^2}}$$

The parameter $\sigma^2$ may be used to control the degree of "mixing" of the photographs and may be user configurable. For example, higher values of this parameter may produce a smoother high dynamic range image and lower values of this parameter may produce an abstract "cartoon like" high dynamic range image.

The process combining the photographs may be parallelized, for example, by carrying out the processing for each image element in parallel. The process of combining the photographs may be implemented on a graphics processing unit (GPU) for example but this is not essential.

Figure 3:
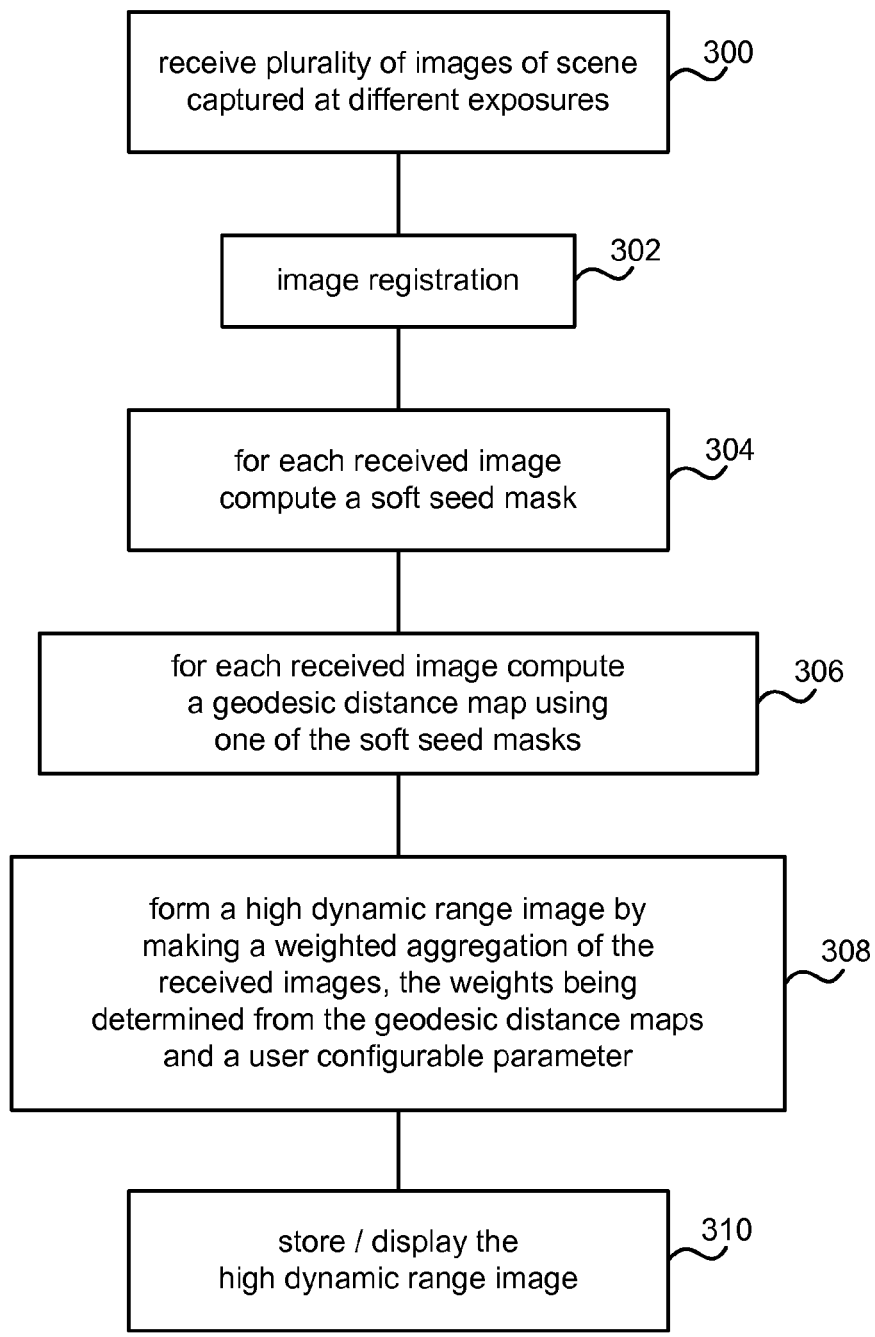
FIG. 3 is a flow diagram of a method of forming a high dynamic range image.

FIG. 3 is a flow diagram of a method of computing a high dynamic range image. A plurality of images of a scene are captured 300 at different exposures. The captured images are placed into registration 302 using any suitable registration process. For each received image a soft seed mask is computed 304. For each received image a geodesic distance map is computed 306 using the corresponding soft seed mask. A high dynamic range image is formed 308 by making a weighted aggregation of the received images, the weights being determined from the geodesic distance maps and a user configurable parameter. The high dynamic range image may be stored or displayed 310.

In some examples the seed masks are defined exactly (without using probabilities). The methods of FIGS. 2 and 3 are then modified by computing the seed masks exactly and by computing a geodesic distance transform rather than a generalized geodesic distance transform.

Figure 4:
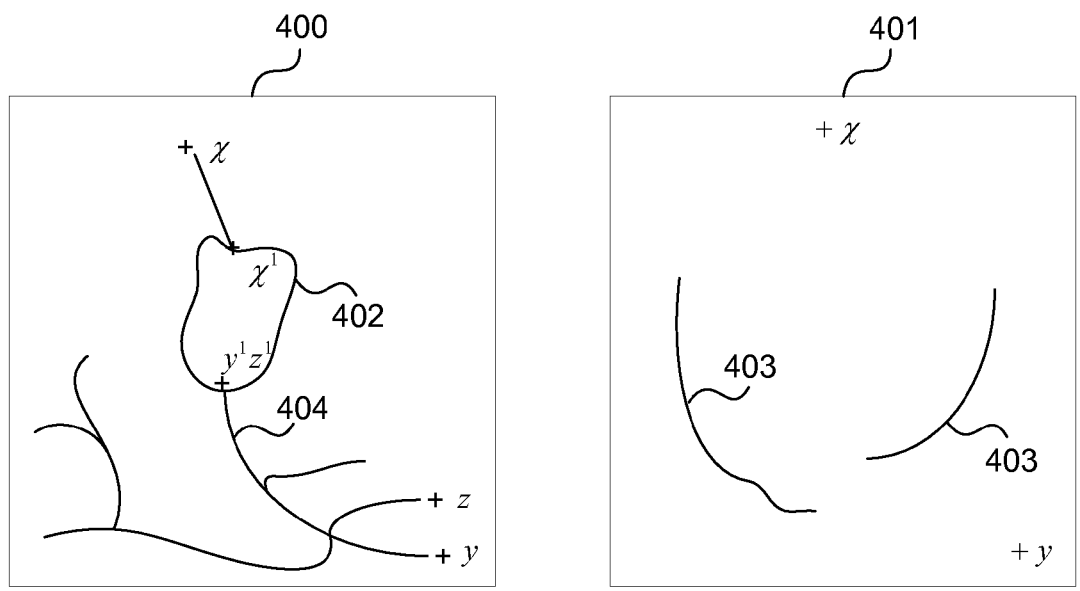
FIG. 4 is a schematic diagram of a geodesic distance map of an image and an intensity gradient map of the same image.

FIG. 4 illustrates schematically an intensity gradient map 401 of an image and a geodesic distance map 400 of the same image. A seed region 402 is illustrated in the geodesic distance map 400. This seed region 402 may be a single point in some examples. In other examples it may be a defined image region such as provided by a binary segmentation mask or in any other manner. In the examples described above with reference to FIGS. 2 and 3, the seed region is "soft" in that it is defined probabilistically. In this case a probability distribution is used to model the belief that a given image element belongs to the seed region.

The intensity gradient map 401 indicates regions in the image where the intensity values change rapidly and these are shown as lines 403. The process of forming a geodesic map corresponding to the image comprises finding, for each image element, the shortest geodesic distance to the seed region 402. For point x in FIG. 4 this corresponds to a Euclidean distance from x to point x' because there are no high intensity gradients to cross. However, the shortest geodesic distance from point y to the seed region 402 is a curved line 404 from y to y' in FIG. 4 because the path needs to travel between the high intensity gradient lines 403. This is also the case for image element z which has a curved shortest geodesic distance to z' on the seed region.

Figure 5:
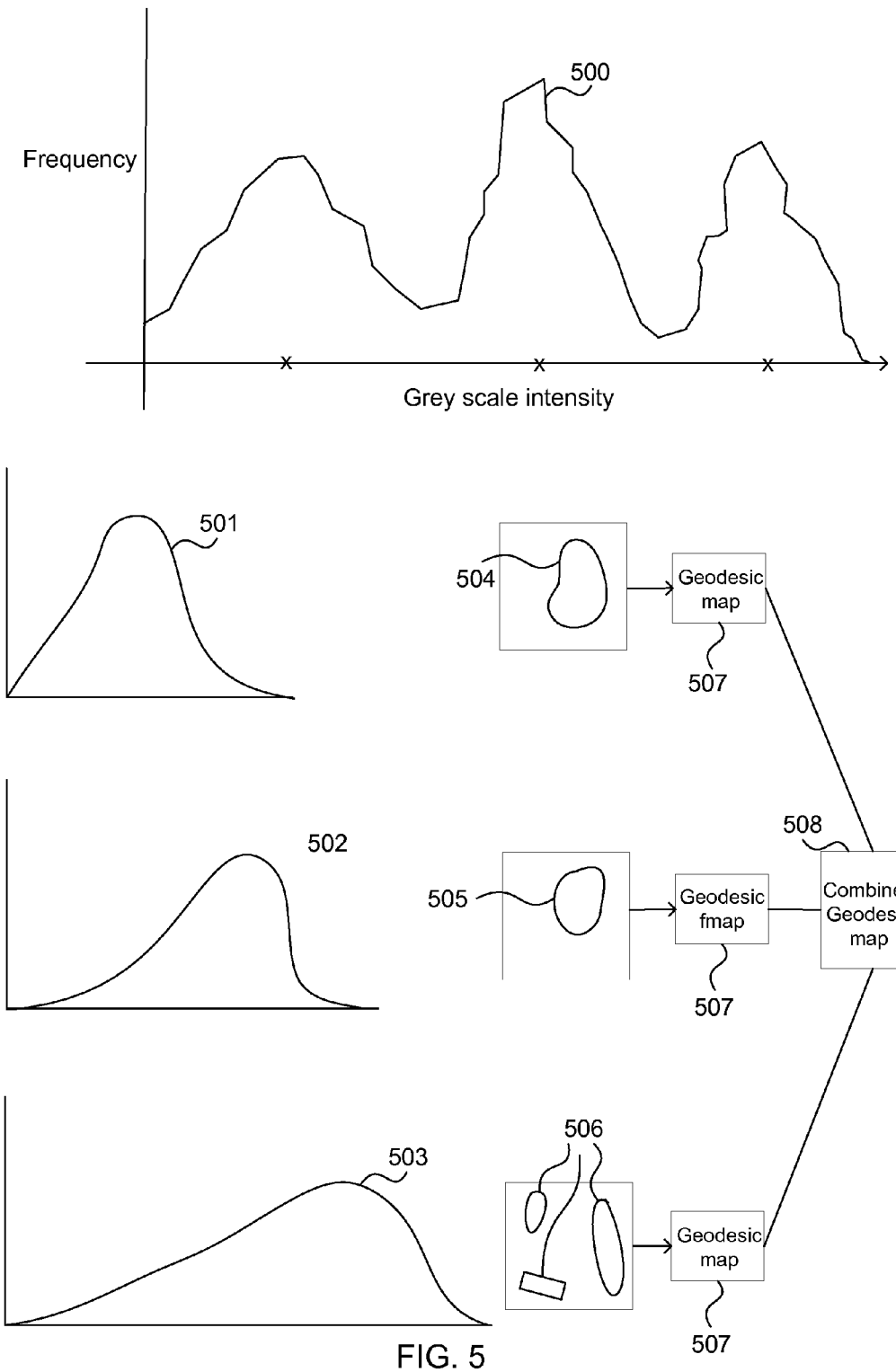
FIG. 5 is a schematic diagram of an image histogram and showing how soft seed masks are automatically generated and used to form a geodesic map representation of an image.

FIG. 5 is a schematic diagram of an image histogram 500 and showing how soft seed regions may be automatically generated and used to form a geodesic map representation of an image. An input image (such as a digital photograph in the example of FIG. 2, 200, 202) is received by the high dynamic range logic (108 of FIG. 1) and used to form a histogram such as 500 in FIG. 5 which plots frequency of image elements against grayscale intensity. In this example, the histogram has three peaks although in practice the histogram may have any form. The high dynamic range logic is arranged to carry out a cluster analysis on the histogram and any suitable type of clustering process may be used. For example, k-means clustering, agglomerative clustering, or other methods. In this example, three clusters are identified by the K-means clustering process, each cluster comprising a probability distribution 501, 502, 503 representing belief that an image element belongs to that cluster. Each of those probability distributions specifies a corresponding soft seed region 504, 505, 506 and it is noted that the soft seed regions need not be contiguous. Each soft seed region may then be used to form its own geodesic map representation of the input image and these are illustrated schematically in FIG. 5 as 507. Those individual geodesic map representations may then be combined into a single geodesic map representation 508. The process of forming the individual geodesic maps 507 may be carried out independently from one another and in parallel. For many practical applications it is found that four or fewer clusters provide good results.

More detail about the process of computing the geodesic distances to form the geodesic maps is now given.

In some embodiments the seed masks are defined exactly (without using probabilities). In these cases a geodesic distance transform (GDT) may be used to determine the geodesic distances. Any suitable geodesic distance transform may be used and an example of a known geodesic distance transform is set out below for ease of reference.

Given a color image I(x): $\Psi \subset R^2 \rightarrow R^3$, a binary mask M(with $M(x) \in \{0,1\}$ 550 x) and a "seed" region (or "object" region) $\Omega$ with $x \in \Omega \Leftrightarrow M(x)=0$, the unsigned geodesic distance of each pixel x from $\Omega$ is defined as:

$$D(x; M, I) = \min_{\{x' | M(x')=0\}} d(x, x'), \text{ with} \quad (1)$$

$$d(a, b) = \inf_{\Gamma \in P_{a,b}} \int_0^1 \sqrt{|\Gamma'(s)|^2 + \gamma^2 \nabla I(s) \cdot \Gamma'(s)^2} ds. \quad (2)$$

with $P_{a,b}$ the set of all possible paths between the points a and b; and $\Gamma(s):R \rightarrow R^2$ indicating one such path, parameterized by the scalar $s \in [0,1]$. The spatial derivative $\Gamma'(s)=\partial \Gamma(s)/\partial s$ represents a vector tangent to the direction of the path. The dot-product in (2) ensures maximum influence for the gradient $\nabla I$ when it is parallel to the direction of the path $\Gamma$. The geodesic factor $\gamma$ weighs the contribution of the image gradient versus the spatial distances. Furthermore, the integral in (2) is the Euclidean length of the 3D path $\tilde{\Gamma}$ that $\Gamma$ defines on the (x, y, I) surface: $\tilde{\Gamma}(s)=[\Gamma(s); \gamma I(\Gamma(s))]$. Also, for $\gamma=0$ eq. (2) reduces to the Euclidean length of the path $\Gamma$.

In other embodiments the seed mask is defined probabilistically. In these embodiments a generalized geodesic distance transform (GGDT) may be used. An example of a known generalized geodesic distance transform is now given.

For example, given a soft seed mask $M(x) \in [0,1]$ the Generalized Geodesic Distance may be defined as follows:

$$D(x; M, I) = \min_{x' \in \Psi}(d(x, x') + vM(x')) \quad (3)$$

with $d(\cdot)$ as in equation (2) above. The fact that eq. (3) uses the soft belief of a pixel belonging to the object of interest means that the latter can be defined probabilistically. This is achieved more economically than having to compute the fully optimized binary segmentation. The Parameter v in eq. (3) establishes the mapping between the beliefs M and the spatial distances. Alternatives to eq. (3) (e.g. minimizing the distance $\sqrt{d^2(x,x')+vM^2(x')}$) may also be used. The geodesic factor $\gamma$ may be pre-configured to a suitable constant value according to the application domain.

The geodesic maps may be computed using parallel processing techniques using graphics processing units, multi-core processors or other computing devices having multiple processors. This applies both in situations where the seed mask is probabilistic and where the seed mask is defined exactly.

Figure 6:
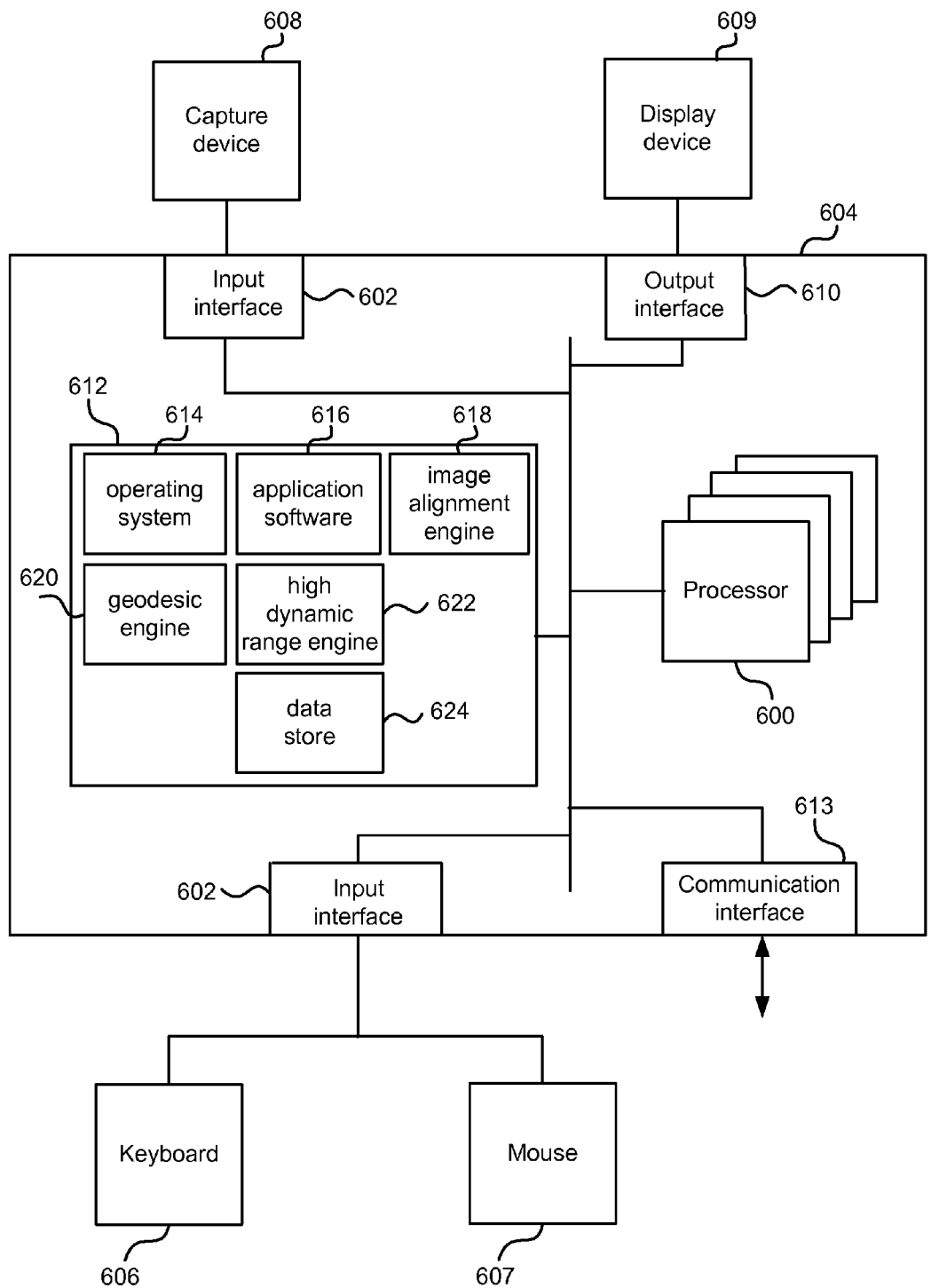
FIG. 6 illustrates an exemplary computing-based device in which embodiments of a high dynamic range computing system may be implemented.

FIG. 6 illustrates various components of an exemplary computing-based device 604 which may be implemented as any form of a computing and/or electronic device, and in which embodiments of a high dynamic range logic may be implemented.

The computing-based device 604 comprises an input interface 602 which is of any suitable type for receiving digital photographs or other digital images at different exposure levels. The input interface may also be arranged to receive media content, Internet Protocol (IP) input, user defined parameter values and optionally input from a keyboard 606, mouse 607 or other user interface devices. In some examples the input interface 602 may detect voice input, user gestures or other user actions and may provide a natural user interface. The device also comprises communication interface 613 to enable it to communicate with other entities over a communications network.

Computing-based device 604 also comprises one or more processors 600 which may be microprocessors, controllers or any other suitable type of processors for processing computer executable instructions to control the operation of the device in order to compute high dynamic range images. In some examples, for example where a system on a chip architecture is used, the processors 600 may include one or more fixed function blocks (also referred to as accelerators) which implement a part of the method of the high dynamic range logic in hardware (rather than software or firmware). Platform software comprising an operating system 614 or any other suitable platform software may be provided at the computing-based device to enable application software 616 to be executed on the device. An image alignment engine 618 may be provided to align digital photographs or other images received at the input interface 602 from the capture device 608 or other entities over the communication interface 613. A geodesic engine 620 is arranged to compute geodesic distances as described above and a high dynamic range engine 622 is arranged to compute seed masks and combine digital images using the seed masks and geodesic distances, for example, as described above with reference to FIGS. 2 and 3. A data store 624 may hold high dynamic range images, user defined parameters, input images and other data.

The computer executable instructions may be provided using any computer-readable media that is accessible by computing based device 604. Computer-readable media may include, for example, computer storage media such as memory 612 and communications media. Computer storage media, such as memory 612, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Although the computer storage media (memory 612) is shown within the computing-based device 604 it will be appreciated that the storage may be distributed or located remotely and accessed via a network or other communication link (e.g. using communication interface 613).

An output interface 610 is also provided such as an audio and/or video output to a display device 609 integral with or in communication with the computing-based device. The display system may provide a graphical user interface, or other user interface of any suitable type although this is not essential. In an embodiment the display device 609 may also act as a user input device if it is a touch sensitive display device.

The term 'computer' or 'computing-based device' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include computer storage devices comprising computer-readable media such as disks, thumb drives, memory and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A computer-implemented method of forming a high dynamic range image comprising:
    receiving a plurality of digital images of the same scene, each digital image having been captured at a different exposure level;
    for each received image, computing a seed mask comprising, for each image element of the received image, an indication as to whether that image element is appropriate for the exposure level of the received image;
    for each received image computing a geodesic distance map using the associated seed mask, the geodesic distance map having a geodesic distance value for each image element of the received image to an image element of the seed mask which is indicated as appropriate for the exposure level of the received image;

combining the received digital images according to the geodesic distance maps to form the high dynamic range image.

2. A method as claimed in claim 1 wherein each geodesic distance value is a shortest geodesic distance value from a received image element to an image element of the seed mask which is appropriate for the exposure level of the received image.

3. A method as claimed in claim 1 wherein the seed mask is a soft seed mask where, for each image element of the received image, the indication as to whether that image element is appropriate for the exposure level of the received image is a probability.

4. A method as claimed in claim 1 wherein combining the received digital images comprises making a weighted aggregation of the received digital images, the weights being related to the geodesic distance maps.

5. A method as claimed in claim 1 wherein combining the received digital images comprises making a linear combination of the received digital images weighted in proportion to the geodesic distance maps.

6. A method as claimed in claim 1 wherein combining the received digital images comprises taking into account a user configurable parameter which controls a degree of mixing of the received digital images.

7. A method as claimed in claim 1 which comprises placing the received digital images into registration using a computer-implemented image registration process.

8. A system for computing a high dynamic range image, the system comprising:
an input arranged to receive a plurality of digital images of the same scene, each digital image having been captured at a different exposure level;
a processor arranged, for each received image, to compute a seed mask comprising, for each image element of the received image, an indication as to whether that image element is appropriate for the exposure level of the received image;
the processor being arranged, for each received image, to compute a geodesic distance map using the associated seed mask, the geodesic distance map having a geodesic distance value for each image element of the received image to an image element of the seed mask which is indicated as appropriate for the exposure level of the received image;
the processor being arranged to combine the received digital images according to the geodesic distance maps to form a high dynamic range image.

9. A system as claimed in claim 8 the processor being arranged to compute the seed mask as a soft seed mask where, for each image element of the received image, the indication as to whether that image element is appropriate for the exposure level of the received image is a probability.

10. A system as claimed in claim 8 the processor being arranged to combine the received digital images by making a weighted aggregation of the received digital images, the weights being related to the geodesic distance maps.

11. A system as claimed in claim 8 wherein the processor is arranged to combine the received digital images by making a linear combination of the received digital images weighted in proportion to the geodesic distance maps.

12. A system as claimed in claim 8 wherein the processor is arranged to combine the received digital images by taking into account a user configurable parameter which controls a degree of mixing of the received digital images.

13. A system as claimed in claim 8 wherein the processor is arranged to place the received digital images into registration using a computer-implemented image registration process.

14. A system as claimed in claim 8 wherein the processor is arranged to compute each geodesic distance values as a shortest geodesic distance value from a received image element to an image element of the seed mask which is appropriate for the exposure level of the received image.

15. A computer-implemented method of forming a high dynamic range image comprising:
receiving a plurality of digital images of the same scene, each digital image having been captured at a different exposure level;
for each received image, computing a soft seed mask comprising, for each image element of the received image, a probability of whether that image element is appropriate for the exposure level of the received image;
for each received image computing a geodesic distance map using the associated soft seed mask, the geodesic distance map having a geodesic distance value for each image element of the received image to an image element of the soft seed mask which is indicated as appropriate for the exposure level of the received image; combining the received digital images according to the geodesic distance maps to form the high dynamic range image.

16. A method as claimed in claim 15 wherein combining the received digital images comprises making a weighted aggregation of the received digital images, the weights being related to the geodesic distance maps.

17. A method as claimed in claim 15 wherein combining the received digital images comprises making a linear combination of the received digital images weighted in proportion to the geodesic distance maps.

18. A method as claimed in claim 15 wherein combining the received digital images comprises taking into account a user configurable parameter which controls a degree of mixing of the received digital images.

19. A method as claimed in claim 15 which comprises placing the received digital images into registration using a computer-implemented image registration process.

20. A method as claimed in claim 15 wherein each geodesic distance values is a shortest geodesic distance value from a received image element to an image element of the seed mask which is appropriate for the exposure level of the received image.

* * * * *